2 Sheets--Sheet 1.

JOSEPH WOODLEY.
Apparatus for Cutting Soles.

No. 128,270.             Patented June 25, 1872.

Witnesses.
C. F. Brown.
S. J. Noyes

Inventor.

Joseph Woodley
by H. W. Beadle,
Atty.

JOSEPH WOODLEY.
Apparatus for Cutting Soles.
No. 128,270.                          Patented June 25, 1872.
FIG. 3
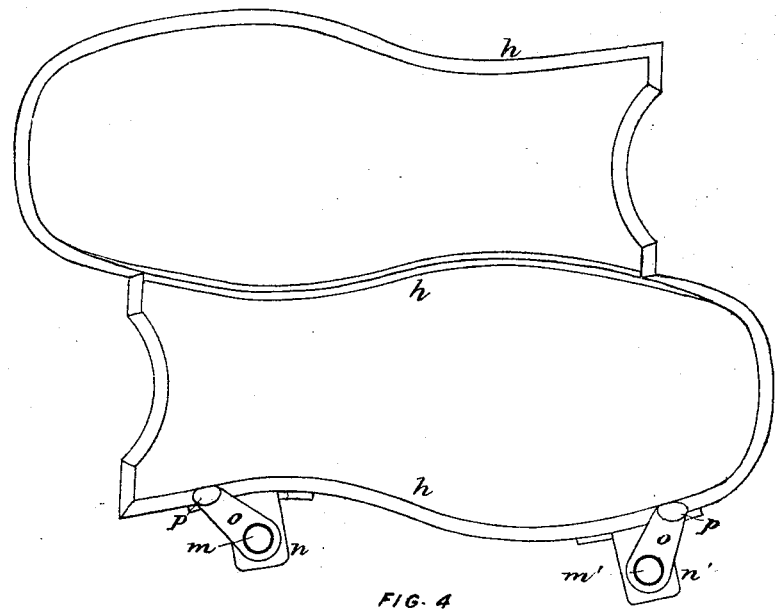
FIG. 4
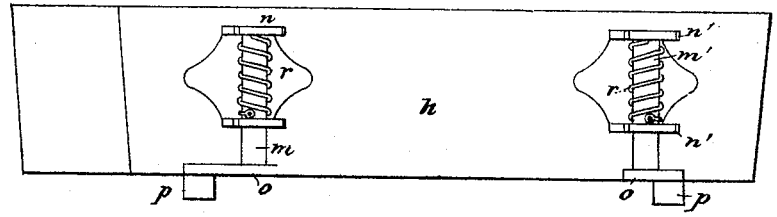
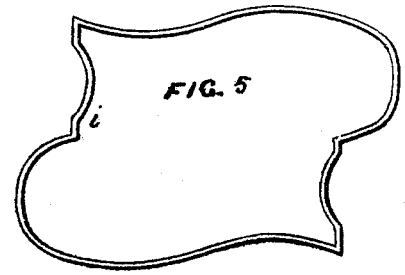
FIG. 5
Witnesses
Inventor
Joseph Woodley
by H. W. Beadle
Atty 128,270

UNITED STATES PATENT OFFICE.

JOSEPH WOODLEY, OF QUEBEC, CANADA, ASSIGNOR TO WOODLEY HEEL AND SOLE CUTTING COMPANY, OF NEW HAVEN, CONNECTICUT.

IMPROVEMENT IN APPARATUS FOR CUTTING SOLES.

Specification forming part of Letters Patent No. 128,270, dated June 25, 1872.

SPECIFICATION.

*To all whom it may concern:*

Be it known that I, JOSEPH WOODLEY, of Quebec, in the district of Quebec and Province of Quebec, have invented a new and useful Method of Cutting Soles and Apparatus therefor; and I do hereby declare that the following is a full and exact description of the same, reference being had to the accompanying drawing and to the letters of reference marked thereon.

This invention consists, first, in an improved die for cutting soles from a side or hide; and second, in certain methods for using my die most advantageously.

Figure 1:
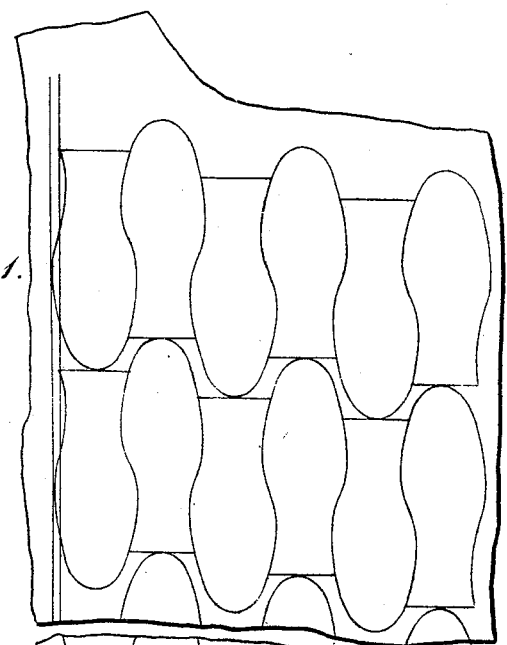
Figure 2:
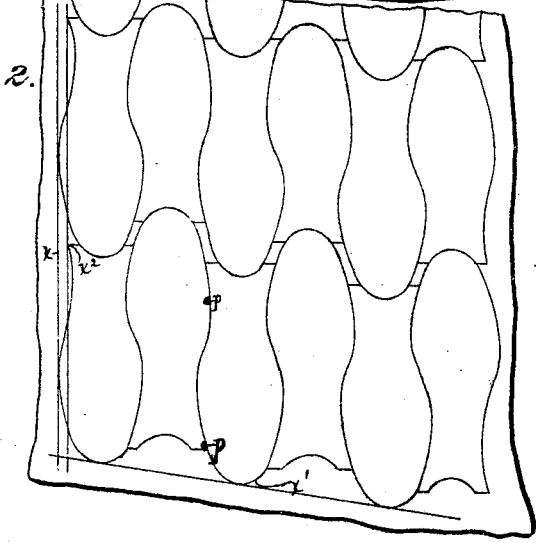

In the drawing, Figures 1 and 2 represent a hide with lines indicating the proper position of the die for the first cut. Figs. 3 and 5 represent plan views of the die; and Fig. 4, a side elevation of the same.

To enable others skilled in the art to make my improved die and use the same in the most advantageous manner, I will now proceed to describe the same and the methods of using it.

$h$ and $i$, Figs. 3 and 5, represent dies, formed of any suitable material and of any proper size, which are provided with a continuous connected outline corresponding with the outline of a pair of shortened soles, the shank of each of which lies adjacent to the ball of the other, as clearly shown in the drawing. In addition to the outline the die $h$ is provided also with a center knife or blade, properly formed to cut the line common to each sole as they lie contiguous to each other.

These dies possess very marked advantages over the narrow die for cutting a single sole. The difficulty with the narrow die is that it is found, in practice, almost impossible for the workman to place and keep it in position either lengthwise or with its side edge placed accurately upon the line of the last sole cut. Even when accurately placed, with its edge upon the line of the last cut, it necessarily inclines toward the open space because its edge is unsupported, and, when struck to make the cut, the yielding of this edge causes the die to move slightly to one side, by which means it is carried more or less beyond the edge of the leather, and an imperfect sole is made which is of no value. If, to obviate this difficulty, the die is drawn back from the extreme edge, a serious waste of material necessarily occurs. Any deviation from the true position, either lengthwise or to either side, necessarily makes every successive cut incorrect, and consequently renders it impossible to cut without great waste. In order that there may be no deviation, and that the soles may be cut correctly, expeditiously, and without waste, the improved dies before described have been devised.

By means of the die $h$ two soles may be accurately cut at one operation, and by means of the die $i$ a piece of leather adapted to form two soles, when afterward properly divided in any suitable manner.

The dies described are found, in practice, to be free from the defects incidental to a narrow die cutting a single sole. A much greater bearing-surface is obtained in my improved die, and consequently the unsupported edge bears but a small proportion to the whole, and, moreover, the sustaining portion or base is further removed from the edge, so that the tendency of the die to incline toward the open space is avoided, and it consequently remains fixed in the position in which it is placed.

Another advantage that arises from the use of the die is that, from the greater extent of outline furnished, more points of contact are obtained, so that the workman is less liable in cutting to go astray. For instance, in cutting up or down with the narrow die cutting a single sole the workman has but one point of contact to guide him in placing his die, and that is a curved line touching upon a straight one, and while one end of the die may be properly placed at that point the other end may be inclined either to the right or left; but with my improved die two points of contact are furnished, so that the proper position above or below the space is accurately determined, and it is rendered impossible for the die to incline incorrectly to the right or left.

Another advantage connected with my improved die is that the parts of the sole which are most difficult to adjust, together with the narrow die cutting a single sole, are permanently fixed in the die. For still greater certainty, however, in the use of these dies I provide spring-guides $m\ m'$, which are preferably supported in brackets $n\ n'$, are provided with arms $o$ set at right angles to the shaft, and having pins $p$. These pins ordinarily project below the cutting-edge of the die, as shown in Fig. 4; but they nevertheless do not interfere with its downward movement, as the spring $r$ yields readily to permit this movement whenever the die descends. If desired, a single strip could be employed instead of the guides shown.

The manner of using the dies and guides is as follows: The first cut having been made at any proper point upon the hide, the die is placed down upon the leather with the projecting points of the guides resting in the space made by the previous cut. The die is now moved so that the pin $p$ of the guide $m'$ located near the toe comes squarely into the corner formed at the outer end of the heel-line, as shown at $p$ in Fig. 2, by which means the true position lengthwise is determined. The other end of the die is now moved around upon this point as a center until the other guide $m$ strikes the edge of the leather upon the side of the cut, by which means the position of the die crosswise is determined.

From this description it will be observed that the die, when these guides are employed, is not located according to the judgment of the workman, but its position is invariably determined by a simple rule, which the most ignorant person can follow without fear of going amiss.

For the purpose of enabling the die to be used in the most advantageous manner possible I have devised a plan for ascertaining accurately the proper place for making the first cut (by means of which the position of all the rest is determined, to some extent) with the least possible waste. The plan is as follows: I first draw a straight line upon the straight side of the hide, as near the edge as possible, as shown at $x$, Sheet 1. I then determine the distance that the die descends at each remove to the right or left, as shown at $x$ in Fig. 2, and also the width of the die. These data being fixed, I am able to ascertain at what angle to draw the bottom line in order to make it certain that the lowest movement of the die will not cause it to project beyond the edge of the hide. For instance, if the die descends a half inch at each remove to the right or left, as the case may be, and if it is six inches in width, I know that my bottom line must be drawn with a descent of one inch to the foot; and by locating a line of this pitch upon the hide at the lowest possible point I am enabled, by making the first cut with the lower portion of the die resting upon this line, to cut across the hide without the danger of causing the die to project over the edge and thus waste material, and also to cut the material in the most economical manner possible. The relative position of the die to the first cut when placed above it may be determined with some degree of accuracy by placing the die so that the heel and toe lines rest upon the edges of the corresponding parts in the first cut; but, to insure perfect accuracy, I employ a different method. I locate the die for the first cut so that the edge of the ball rests upon the straight line, and the heel-line is made to lie squarely at right angles to it, the toe-line, projecting downward, being caused to rest upon the lower line, as shown and described. I now cause to be drawn through the point $x^2$ of the heel-line, a line parallel with the line $x$. By this means the exact position of the die for making the side cuts is determined without a possibility of mistake, the outer line giving the position of the ball and the inner line the position of the heel.

Having thus fully described my invention, what I claim as new, and desire to secure by Letters Patent, is—

1. A loose die for cutting soles, constructed substantially as described and as shown in Figs. 3 and 5, it being provided with extended bearing-surface to give it fixedness of position under pressure, and with an outline adapted to indicate arbitrarily its true position for cutting, as and for the purpose set forth.

2. The combination of the loose die $h$ with guides, substantially as shown and described.

This specification signed and witnessed this 24th day of November, 1871.

JOSEPH WOODLEY.

Witnesses:
   EDM. F. BROWN,
   E. GREENAWAY.